UNITED STATES PATENT OFFICE 2,686,649

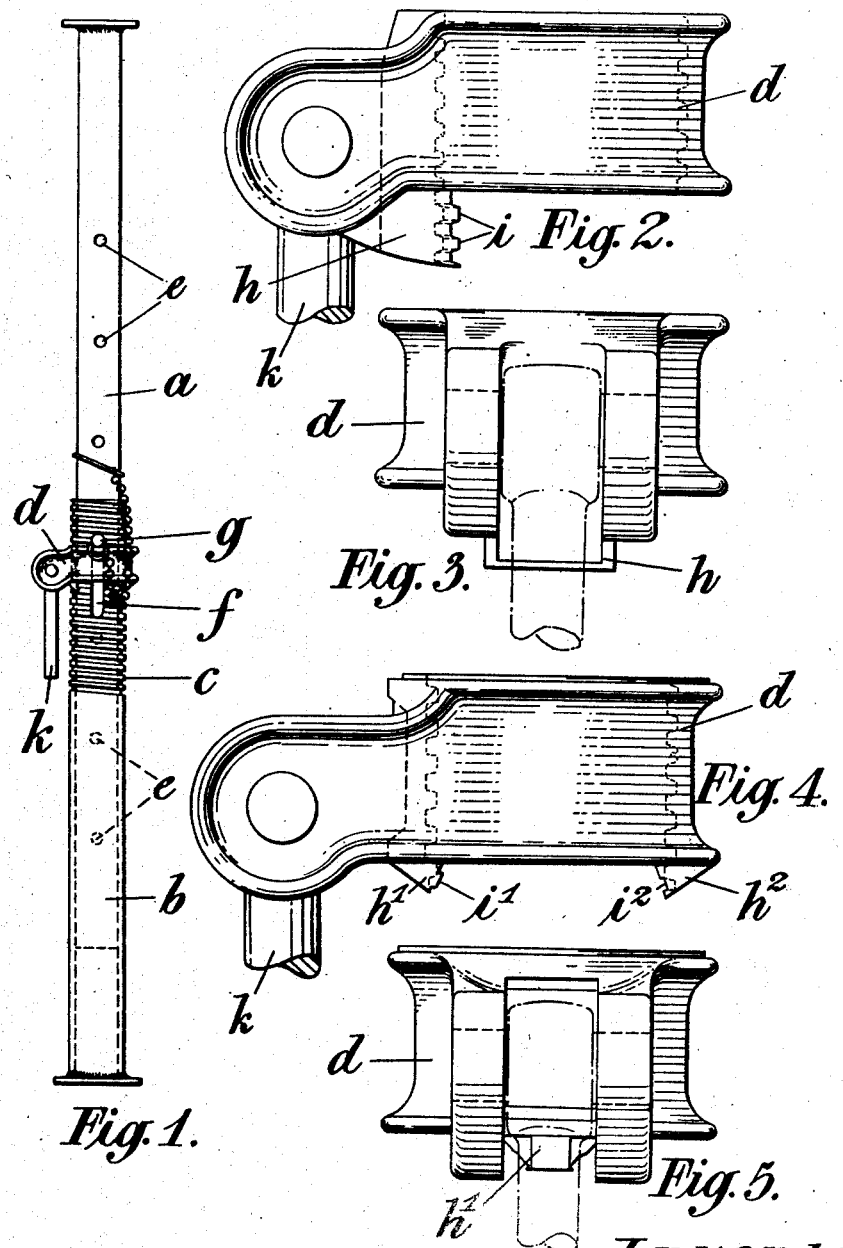

ADJUSTABLE METAL PROP

William Alphonse de Vigier, Northwood, England

Application September 23, 1948, Serial No. 50,798

Claims priority, application Great Britain
June 30, 1948

2 Claims. (Cl. 248—354)

This invention relates to adjustable metal props of the kind comprising two telescopic members adapted to be approximately adjusted to position by locating the inner member in relation to the outer member by means of a pin passing through slots in the outer member and holes in the inner member, final adjustment being effected by a nut engaging a threaded portion of the outer member and bearing against the projecting ends of said pin.

Such props as hitherto constructed suffer from the disadvantage that the threads of the screwed portion rapidly become clogged with dirt and debris (and sometimes even with hard setting cement) with the result that it becomes extremely difficult and sometimes impossible to turn the nut for making the final adjustment.

The object of the present invention is to improve upon the existing arrangements and according to my invention I provide upon the nut a projection or projections shaped and arranged to enter a thread or threads of the screw so that rotation of the nut will cause the projection or projections to push or scrape or plough out from the threads any matter that would otherwise clog the same so that the prop thus becomes self-cleaning and easy manipulation of the adjusting nut is at all times possible.

The accompanying drawings illustrate two modes of carrying out the invention.

Figure 1 is an elevation of one form of prop in accordance with the invention.

Figure 2 is a side elevation on a larger scale of a part shown in Figure 1.

Figure 3 is an end view of Figure 2, and

Figures 4 and 5 are similar views to Figures 2 and 3 showing a modification.

In carrying my invention into effect in one convenient manner I form the adjustable prop in any suitable or usual manner with an inner member $a$ and an outer telescopically related member $b$ having a threaded portion $c$ for engagement by a nut $d$ which may be formed, for example, in the manner described and claimed in the specification of my pending application Serial No. 754,301 or in any other suitable manner. The inner telescopic member $a$ is provided in its length with a number of spaced diametral holes $e$ and the threaded portion $c$ of the outer member $b$ is provided with longitudinal slots $f$ on either side thereof and in line with the holes in the inner member. The arrangement is such that the two members (the opposite ends of which may be suitably formed depending upon the purpose for which the prop is required) may first be adjusted approximately to position by means of a pin $g$ passed through the slots and apertures above referred to and surmounting the nut $d$ so that final adjustment can be effected by rotation of the nut which bears against the projecting ends of the pin and thus moves the inner member to final position.

In accordance with my invention I provide the nut $d$ with a lug $h$ having one or more teeth or projections $i$ thereon adapted to enter a thread or threads of the screwed portion $c$ of the outer member $b$ such that on rotation of the nut $d$ to effect the necessary adjustment the projection or projections $i$ will clear the threads of any matter tending to clog the same and it is found in practice that because the nut is usually provided with a lever such as $k$, the threads will be thoroughly cleared of such matter and even of any cement or the like that may have set solid in the threads. The projections may be arranged to act by a direct thrust upon the clogging matter or they may be set sideways in the manner of a plough-share so as to plough out the matter from the threads.

Figures 4 and 5 show a modification in which the nut $d$ is provided with two lugs $h'$ $h^2$ each bearing a portion of a mutilated thread $i'$ $i^2$ meshing with a thread of the portion $c$.

It will be understood that the invention extends broadly to a prop of the above character which is made self-cleaning by arrangements provided upon the nut for removing any debris from the threads, and the invention therefore is not to be limited to the actual construction of prop or nut or to the particular details which have hereinbefore been given by way of example to describe the nature of the invention and not to limit its scope.

I claim:

1. An adjustable prop comprising two telescopic members, the inner member being provided with longitudinally spaced pairs of diametrically opposed holes and the outer member having a portion of its outer surface formed with a square thread and provided with diametrically opposed longitudinally extending slots in said portion, a pin passing through the slots and a pair of the holes, a nut engaging upon the screw thread on the outer member and bearing in use against the projecting ends of said pin, a lug integral with said nut and extending from that end face of the nut opposite to that bearing against said pin, said lug having tooth means engaging with the screw thread upon the outer telescopic member and meshing with the thread for removing debris from the threads by a sideways ploughing action upon rotation of the nut in either direction.

2. An adjustable prop in accordance with claim 1, in which said nut is provided with a pair of such lugs disposed substantially at opposite ends of a diameter of said nut on the same face thereof, and each lug having tooth means engaging and meshing with the screw thread.

References Cited in the file of this patent

UNITED STATES PATENTS

| Number | Name | Date |
|---|---|---|
| 1,785,406 | Cornett | Dec. 16, 1930 |
| 1,937,547 | Cartlidge | Dec. 5, 1933 |
| 2,468,484 | Clark | Apr. 26, 1949 |

FOREIGN PATENTS

| Number | Country | Date |
|---|---|---|
| 514,234 | Great Britain | Nov. 2, 1939 |